UNITED STATES PATENT OFFICE.

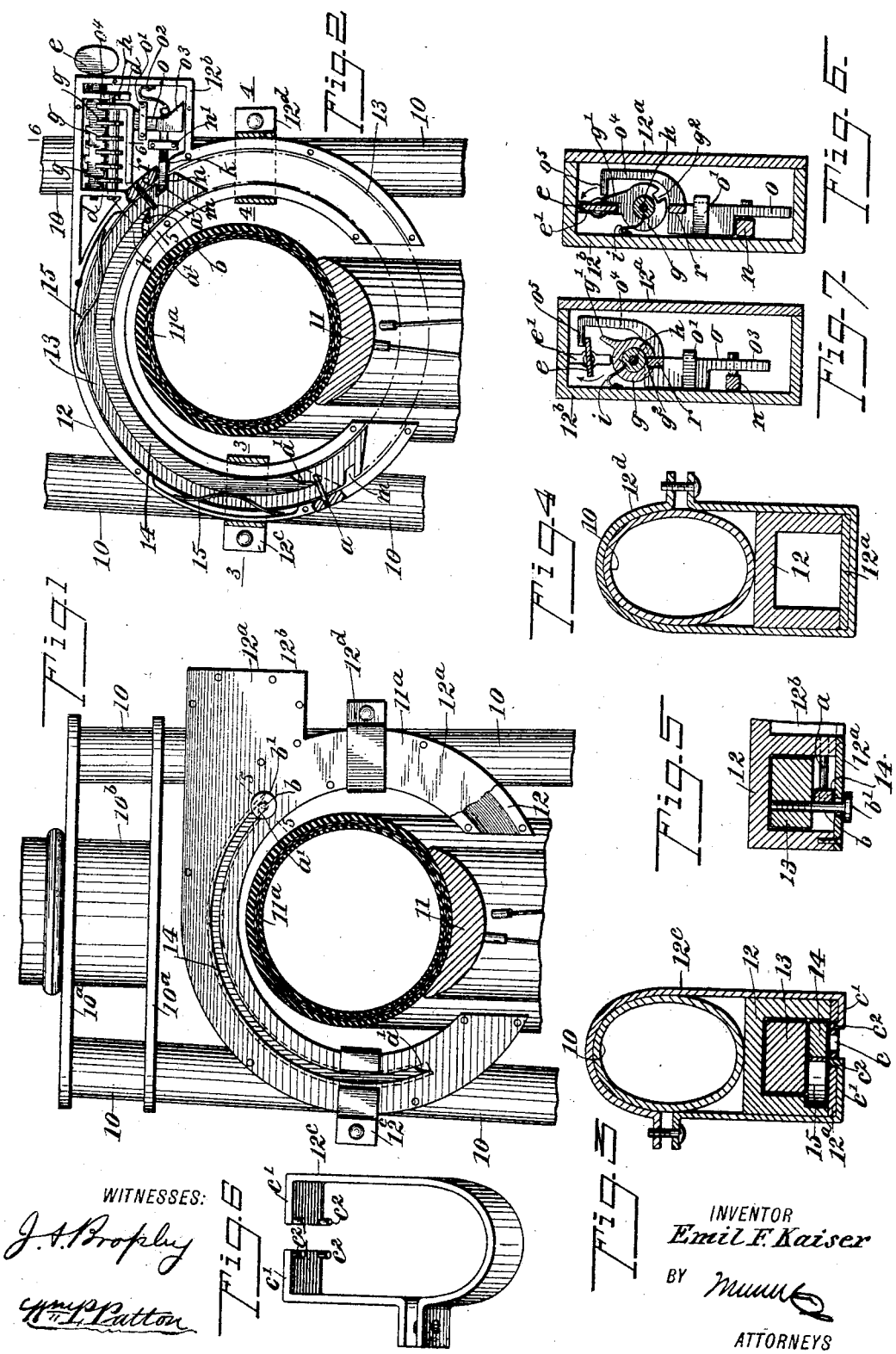

EMIL FREDERICK KAISER, OF FRESNO, CALIFORNIA.

LOCKING DEVICE FOR BICYCLES.

No. 805,207. Specification of Letters Patent. Patented Nov. 21, 1905.

Application filed September 1, 1904. Serial No. 222,977.

*To all whom it may concern:*

Be it known that I, EMIL FREDERICK KAISER, a citizen of the United States, and a resident of Fresno, in the county of Fresno and State of California, have invented a new and Improved Locking Device for Bicycles, of which the following is a full, clear, and exact description.

This invention has for its object to provide a locking device for bicycles or the like having novel simple details of construction which afford a very secure means for preventing the rotation of either the front or rear wheel of a bicycle, and thus render the bicycle useless as a vehicle until the device is unlocked with a suitable key.

The invention consists in the novel construction and combination of the several parts, as will be hereinafter fully set forth, and pointed out in the claims.

Reference is to be had to the accompanying drawings, forming a part of this specification, in which similar characters of reference indicate corresponding parts in all the figures.

Figure 1 is a side view of the improved locking device mounted upon a portion of the front fork of a bicycle-frame and a sectional fragmentary portion of a bicycle-wheel partially encircled by the casing of the lock. Fig. 2 is a similar view of the details shown in Fig. 1, but exposing the details of the locking device by removal of the cover-plate for the casing. Fig. 3 is an enlarged transverse sectional view substantially on the line 3 3 in Fig. 2. Fig. 4 is an enlarged transverse sectional view substantially on the line 4 4 in Fig. 2. Fig. 5 is an enlarged transverse sectional view taken substantially on the line 5 5 in Fig. 2. Fig. 6 is a vertical transverse sectional view of the locking mechanism in locked adjustment, taken substantially on the line 6 6 in Fig. 2; and Fig. 7 is a similar view to Fig. 6, but showing the locking mechanism in unlocked adjustment.

The members 10 of a bicycle-frame, shown in part, may in completed condition be the legs of a front frame-fork or a rear fork and, as usual, are tubular, having oval contour in cross-section. These members, that in the drawings may be regarded as portions of the front fork of a bicycle, are held spaced apart at their upper ends by yoke-bars $10^a$, which carry a sleeve-box $10^b$.

The wheel-rim 11 and tire $11^a$ (shown fragmentarily in Figs. 1 and 2 and that completed form the front wheel of the bicycle) are held to rotate in end portions of the fork-legs 10 in any approved manner, so that the wheel is disposed centrally between said legs, as indicated in the drawings.

The improvement, in brief, consists in providing a locking-bolt carried by the legs of the frame-fork, so that it may be passed transversely through the wheel said fork supports, and also providing a suitable locking device for holding the locking-bolt in position across and through the wheel, thereby preventing the bicycle from receiving progressive movement until the locking-bolt is withdrawn from its position in the wheel.

A casing 12 for the locking device is in the form of an annular box having an open side that is normally closed by a cover-plate $12^a$, and, as shown, a segment is removed from the mainly-circular box, producing a gap of proper width between the open ends of the same. The cover-plate $12^a$ conforms peripherally with the contour of the casing 12 and together with it affords space for the free traverse of the wheel rim and tire in the opening defined by the curved inner wall of the casing when the casing and cover-plate are secured upon the fork members 10.

The preferred means for securing the casing 12 and cover-plate $12^a$ upon the fork of a bicycle consists of two clamps $12^c$ $12^d$, that embrace the legs 10 of the fork and are bolted thereon, as shown clearly in Figs. 1 to 4 of the drawings.

An arcuate slot $c$ is formed in the cover-plate $12^a$, the use of which will be described, and, as shown in Fig. 3, the clamp $12^c$ is furnished with hooks $c^2$, that are embedded in perforations of the cover-plate near the edges of the slot therein, these hooks or studs being formed near spaced ends $c'$ of the clamp $12^c$. The casing 12, with its cover-plate $12^a$, are together clamped upon the fork members 10 near the yoke-bars $10^a$, which permits the wheel-rim and the tire thereon to work freely in the central opening in the casing and cover-plate.

In the casing 12 a nearly-semicircular locking-bolt 13 is inserted, fitting loosely therein and held to slide endwise by keeper pins $a$ or the like, that project from the outer side wall of the casing and have loose contact with the side of the bolt that is nearest to the cover-plate $12^a$.

A handle-shank $b$ projects from the outer side of the locking-bolt 13 near one end and passes through the arcuate slot $c$ in the cover-plate 12$^a$, the curvature of said slot permitting the free traverse of the shank $b$ therein when the knob $b'$ on the outer end of said shank is manipulated.

In space provided between the locking-bolt 13 and the cover-plate 12$^a$ a slot-cover 14 is loosely held and pressed over the slot $c$ by bow-springs 15, that are located between the outer side wall of the casing 12 and an opposite side of the slot-cover.

The ends of the cover 14 are sloped, as shown at $a'$ in Fig. 2, for slidable engagement of the shank $b$ therewith, and it will be seen that upon manipulation of the knob $b'$ on the outer end of the shank, so as to slide the locking-bolt 13 in either direction to project or retract it, the engagement of the shank with an adjacent slope $a'$ will press the slot-cover 14 away from the slot $c$ against stress of the springs 15, and thus permit the bolt 13 to receive sliding adjustment.

The bolt-casing 12 is provided with a lateral extension 12$^b$, preferably at the right side and near the upper side thereof, this case extension, that is mainly rectangular, containing the means for locking the bolt 13 and releasing it, as may be desired, and, as appears in Figs. 1, 6, and 7, the cover-plate 12$^a$ is extended to form a closure for the supplementary case 12$^b$.

The lock mechanism contained in the supplementary case 12$^b$ and which embodies novel features consists, essentially, of the following-described details: In arms $d$, that project down from the top wall of the supplementary case 12$^b$ and which are suitably spaced apart, opposite lateral openings are formed to receive and afford rotatable support for a key $e$, that is insertible through an orifice $e'$ in the outer end wall of said case, as appears in Figs. 6 and 7. At a proper distance below the bearings for the key $e$ a series of tumbler-wheels $g$ is supported upon a cylindrical shaft $h$, that is held in opposite perforations in the depending arms $d$, these wheels being properly spaced apart by the contact of their hubs at adjacent ends thereof. Each tumbler-wheel $g$ is provided with a projection or abutment, which projects up at one side of the keyhole and key $e$ when the latter is inserted in the keyhole, so that a turning movement of the key in direction of the curved arrow in Fig. 6 will press an appropriate bit of the key against an opposite abutment and rock the tumbler-wheel accordingly. In the normally lower edge of each tumbler-wheel $g$ a preferably rectangular notch $g^2$ is formed, these notches each being positioned somewhat to one side of the vertical plane of the abutments $g'$, and, as indicated in Fig. 6, a spring $i$, which is affixed at its ends, respectively, upon the rear upright wall of the case 12$^b$, and the hub of a respective tumbler-wheel, serves to normally hold the abutment-arms $g'$ upright and near the key-body $e$ parallel therewith. At a suitable point above the bottom wall of the case 12$^b$ a horizontal slot $k$ is formed in the wall that separates the supplementary case from the bolt-holding casing 12.

Each end of the locking-bolt 13 may be beveled toward its inner edge, as is shown in Fig. 2, and in the outer edge of said bolt near each end a recess $m$ is formed, which may be successively disposed opposite the slot $k$ by a suitable movement of the locking-bolt.

A latch-bar $n$ is loosely secured in the case 12$^b$, so as to reciprocate in a horizontal plane toward and from a socket or recess $m$ through the slot $k$ by means of a clip-plate $n'$, which is attached upon the rear wall of the case 12$^b$. The latch-bar is also loosely connected with an upright arm $o$, held to slide on the back of the case by a clip-plate $o'$, affixed upon the latter, and, as shown in Fig. 2, a spring $o^2$ is connected by one end to the rear or inner end of the latch-bar and at the opposite end upon the outer end wall of the case 12$^b$, the stress of said spring normally pressing the latch-bar toward the locking-bolt 13.

Upon the lower end of the arm $o$ a cam-slope $o^3$ is formed, which inclines downward and toward the end wall of the case 12$^b$, and, as shown, the latch-bar $n$ is furnished with an enlargement on its inner or rear end, which may ride upon the incline or cam-slope $o^3$, that will pull the latch-bar inward when the arm $o$ is slid upward. A check-bar $r$ is formed on the upper end of the arm $o$ and projects horizontally below and near to the tumbler-wheels $g$.

Above the cam-slope $o^3$ a lifter-finger $o^4$ is formed on the arm $o$ at its upper end, said arm being so positioned that it clears the peripheral edge of an adjacent tumbler-wheel $g$ and abutment $g'$ thereon. The lifter-finger $o^4$ is provided with a bent upper end that projects into the path of a bit on the key $e$, which latter will bear upon the lower side of said bent upper end $o^5$ as the key is turned in direction of the arrow in Fig. 6 and raise the arm $o$, which will cause the cam-slope $o^3$ to pull upon the latch-bar $n$.

Before the bit on the key $e$ engages the bent end $o^5$ other appropriate bits on said key will engage with the abutment-arms $g'$ and turn the tumbler-wheels $g$ so as to aline the notches $g^2$ in said tumbler-wheels.

The abutment-arms $g'$ near their free ends are still in contact with respective bits on the key $e$ when the key contacts with and commences to raise the lifter-finger $o^4$, which contact will hold the notches $g^2$ alined, so that the initial upward movement of the arm $o$ will enter the upper edge of the check-bar $r$ into the notches $g^2$, whereupon a continuation of rocking movement given to the key $e$ will effect the complete elevation of the cam-sloped edge $o^3$ and the retraction of the latch-bar $n$.

If the details of the entire locking device have been adjusted to lock the slidable bolt 13 in a position that releases the bicycle-wheel for free rotation, as indicated in Fig. 2, the retraction of the latch-bar $n$ will obviously permit the locking-bolt 13 to receive longitudinal sliding movement so as to project the end thereof that is farthest from the latch-bar $n$ across the space between the ends of the casing 12, through the wheel near its rim 11, until the recess $m$ in the end of the locking-bar that approaches the slot $k$ is disposed oppposite it, whereupon the key $e$, which has been held to maintain the retraction of the latch-bar $n$, is turned in the direction indicated by the curved arrow in Fig. 7. This will permit the stress of the spring $o^2$ to push the latch-bar $n$ into the recess $m$ and draw the arm $o$ down, which will dispose the cam-slope $o^3$ as shown in Fig. 6 and remove the check-bar $r$ from engagement within the notches $q^2$, which will permit the springs $i$ to return said notches to the normal positions indicated for one wheel in Fig. 6, and the key $e$ may now be removed. When locked, the bolt 13 will permit the cover 14 to close the slot $c$ in the cover-plate $12^a$.

It will be noted that unless a key having the exact conformation specified is employed the bolt 13 cannot be released, and of course the bicycle-wheel engaged by it cannot revolve.

It will be seen that the removal of the clamps $12^c$ $12^d$ from the fork members 10 will not release the wheel that has been locked by the projection of the locking-bolt 13 therethrough, as the lateral projection of the case extension $12^b$ will prevent a free rotation of the wheel.

Having thus described my invention, I claim as new and desire to secure by Letters Patent—

1. A bicycle-lock, comprising a casing curved edgewise and having an opening therein, a cover-plate securable on the casing and having an arcuate slot therein, a locking-bolt longitudinally slidable in the casing by means of a handle that works in the slot, and a spring-pressed slot-cover loosely held in the casing.

2. A bicycle-lock, comprising a casing curved edgewise and having an opening therein, a cover-plate having an arcuate slot therein and securable on the casing, a slot-cover laterally spring-pressed toward the arcuate slot, normally closing it, a locking-bolt slidable in the casing, a handle on the bolt, working in the slot, said handle pressing the slot-cover against stress of the springs that engage it, and means for locking the bolt projected or retracted.

3. A bicycle-lock comprising a casing curved edgewise, two looped clamps located oppositely on the casing and holding it secured on the spaced wheel-controlling fork of a bicycle-frame, a cover securable on the casing, said cover having an arcuate slot therein, a curved locking-bolt reciprocal in the casing and manipulated by a handled shank working in the arcuate slot, a spring-pressed slot-cover normally closing the arcuate slot, and keeper-pins at the ends of the bolt for controlling its sliding movement, each end of the slot-cover being sloped edgewise to permit the handled shank on the bolt to press said slot-cover from over the slot.

In testimony whereof I have signed my name to this specification in the presence of two subscribing witnesses.

EMIL FREDERICK KAISER.

Witnesses:
BERTRAND SAIER,
J. H. COLEMAN.